(12) United States Patent
Chattopadhyay et al.

(10) Patent No.: US 10,151,475 B2
(45) Date of Patent: Dec. 11, 2018

(54) SYSTEM FOR DETERMINING SCALING IN A BOILER

(71) Applicant: Intel Corporation, Santa Clara, CA (US)

(72) Inventors: Rita Chattopadhyay, Chandler, AZ (US); Hoang Van, Phoenix, AZ (US); Trevor Ryan, Shannon (IE); Paul Hough, Shannon (IE)

(73) Assignee: Intel Corporation, Santa Clara, CA (US)

( * ) Notice: Subject to any disclaimer, the term of this patent is extended or adjusted under 35 U.S.C. 154(b) by 670 days.

(21) Appl. No.: 14/463,401

(22) Filed: Aug. 19, 2014

(65) Prior Publication Data

US 2016/0053990 A1   Feb. 25, 2016

(51) Int. Cl.
*F22B 37/38* (2006.01)
*G01M 99/00* (2011.01)

(52) U.S. Cl.
CPC ............. *F22B 37/38* (2013.01); *G01M 99/00* (2013.01)

(58) Field of Classification Search
None
See application file for complete search history.

(56) References Cited

U.S. PATENT DOCUMENTS

| | | |
|---|---|---|
| 5,353,653 A | 10/1994 | Watanabe et al. |
| 2010/0212603 A1 | 8/2010 | Ookubo et al. |
| 2015/0160099 A1* | 6/2015 | Hamouz ............. G01M 99/002 702/45 |

FOREIGN PATENT DOCUMENTS

| | | | |
|---|---|---|---|
| CN | 201787554 U | * | 4/2011 |
| CN | 102052662 A | * | 5/2011 |
| JP | 11201406 A | | 7/1999 |
| JP | 2001124304 A | | 5/2001 |
| JP | 2008-21657 A | | 9/2008 |
| JP | 2013036688 A | | 2/2013 |

(Continued)

OTHER PUBLICATIONS

International Search Report and Written Opinion received for PCT Application No. PCT/US2015/035193, dated Oct. 19, 2015, 12 pages.

(Continued)

*Primary Examiner* — John Kuan
(74) *Attorney, Agent, or Firm* — Grossman, Tucker, Perreault & Pfleger, PLLC

(57) ABSTRACT

The present disclosure is directed to a system for determining scaling in a boiler. At least one sensor may monitor a boiler during operation and provide sensor data to a boiler monitoring module including a boiler scaling determination module that may determine an amount of scaling in the boiler. Example sensor data may comprise power input, a temperature of liquid in the boiler and an air temperature within an enclosure housing the boiler. The boiler monitoring module may determine thermal energy transfer to the boiler based on the liquid and enclosure temperatures. A machine learning engine may determine a rate of thermal energy transfer to the liquid in view of the power input, the rate of thermal energy transfer being evaluated by the machine learning engine to identify delay in the rate of thermal energy transfer that quantifies an amount of scaling in the boiler.

19 Claims, 6 Drawing Sheets

(56) References Cited

FOREIGN PATENT DOCUMENTS

| JP | 2013195021 A | 9/2013 |
|---|---|---|
| WO | 2006-038109 A2 | 4/2006 |

OTHER PUBLICATIONS

Office Action received for Taiwan Patent Application No. 104122562, dated May 2, 2016, 4 pages of English translation and 6 pages of Taiwan Office Action.
Taiwanese Office Action issued in Taiwanese Application No. 104122562, dated Aug. 2, 2016, with English translation.
International Preliminary Report on Patentability and Written Opinion issued in PCT Application No. PCT/US2015/035193, dated Mar. 2, 2017, 9 pages.
Japanese Office Action issued in Japanese Application No. JP2017-509745, dated Feb. 27, 2018, with English translation, 10 pages.
European Search Report issued in European Application No. 15833350.0, dated Mar. 16, 2018, 7 pages.
Japanese Notice of Allowance issued in Japanese Application No. JP2017-509745, dated Aug. 22, 2018, with English translation, 6 pages.

\* cited by examiner

SYSTEM FOR DETERMINING SCALING IN A BOILER

TECHNICAL FIELD

The present disclosure relates to monitoring systems, and more particularly, to a system for determining an amount of scaling in a boiler using a physics and/or machine-learning model.

BACKGROUND

Boilers for heating various liquids may be employed in a variety of domestic, commercial and/or industrial applications. For example, a common application is a boiler for heating water to make hot beverages like coffee, tea, etc. An example boiler may comprise a heating element (e.g., a heating tube) immersed in a vessel containing the water to be heated. Heating elements may run on electricity, gas, etc. A problem that may affect the performance of boilers that heat water is scaling. Scaling in boiler may be caused by impurities in the water being deposited on the boiler heating tubes. These depositions, which are predominantly made up of silica, calcium or magnesium salts, have very low thermal conductivity compared to materials commonly used to make boiler tubes (e.g., copper or steel). Scaling in a boiler may substantially reduce the heat transfer rate from heating tube to the water, which may at least reduce the operational efficiency of the boiler, but at its most serious may also create a potentially hazardous operating condition.

In particular, scaling may cause potentially hazardous hot spots on boiler heating tubes. If unchecked, scaling may act as an insulator that progressively reduces boiler efficiency due to heat retardation. Scale built-up may eventually cause a boiler heating tube to overheat, rupture, etc. Returning to the hot beverage example, it is especially important to ensure that boilers in a hot beverage vending machine remain scale free, as scale not only may affect the safe operation and efficiency of the vending machine as discussed above, but may also affect the water quality, and subsequently, the taste of dispensed beverages. Presently, boilers in hot beverage vending machines are replaced on routine basis as per traditional preventive maintenance principles (e.g., based on a manufacturer's recommendation). As a result, the replacement of boilers may occur frequently in situations where replacement is unnecessary based on the actual condition of the boiler. Replacing boilers that do not actually require replacement may result in, for example, a waste of money and inconvenience for the vending machine operators and their customers.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
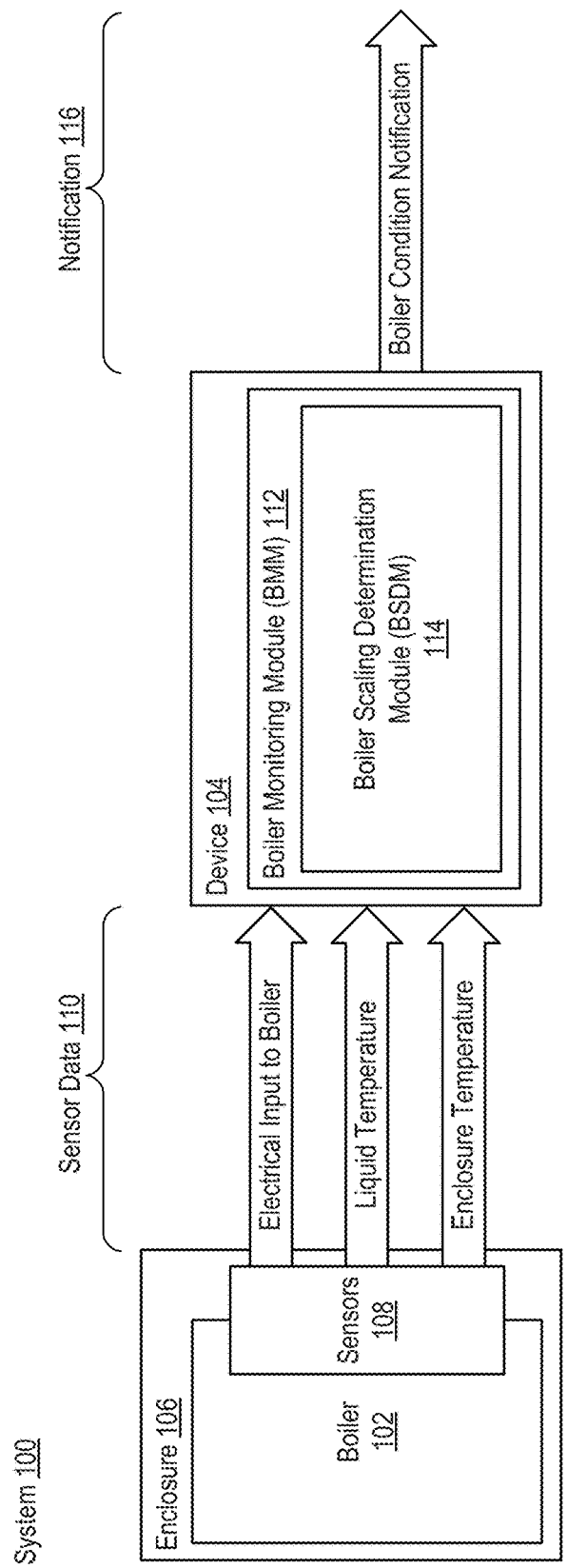
FIG. 1 illustrates an example system for determining scaling in a boiler in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a system for determining scaling in a boiler. In one embodiment, at least one sensor may monitor a boiler during operation. The at least one sensor may then provide sensor data to a boiler monitoring module (BMM) including at least a boiler scaling determination module (BSDM) that may utilize the sensor data to determine an amount of scaling in the boiler. The sensor data may comprise, for example, power input to heating tubes in the boiler, liquid temperature in the boiler and a temperature of an enclosure in which the boiler is operating. The BMM may determine heat transfer to the boiler based on the sensed temperature of the liquid and the enclosure temperature. A machine learning engine in the BSDM may then determine a rate of thermal energy transfer to the liquid in the boiler in view of the power input, the rate of thermal energy transfer then being evaluated by the machine learning engine to identify delay in the rate of thermal energy transfer that quantifies an amount of scaling in the boiler. The boiler monitoring module may then cause an indication of boiler condition to be generated. The boiler monitoring module may be incorporated in a device that resides within the enclosure, partially within the enclosure, or remotely from the enclosure. In one embodiment, the device may be part of a remote monitoring system that monitors boiler condition utilizing a local-area network (LAN) or a wide-area network (WAN) like the Internet.

In at least one embodiment, a system may be configured to determine scaling in a boiler. The system may comprise, for example, a boiler, an enclosure in which the boiler operates, at least one sensor and a device. The boiler may be to heat a liquid. The at least one sensor may be to generate sensor data in regard to operation of the boiler. The device may include at least a communication module to receive the sensor data from the at least one sensor and a BMM having a BSDM to determine an amount of scaling in the boiler based at least on the sensor data.

For example, the at least one sensor may be to sense at least power input to heat the liquid in the boiler, a temperature of the liquid in the boiler and an enclosure temperature, the sensor data including the power input, liquid temperature and enclosure temperature. The BSDM may be to at least one of remove noise from the sensor data or validate the sensor data. The BSDM may further be to determine thermal energy transfer to the boiler based at least on the power input and the liquid temperature. The BSDM may comprise, for example, a machine learning engine to determine the amount of scaling in the boiler based at least on the thermal energy transfer to the boiler and the enclosure temperature. The machine learning engine being to determine the amount of scaling in the boiler may comprise the machine learning engine being to determine a rate of thermal energy transfer to the liquid in the boiler in view of the enclosure temperature, the rate of thermal energy transfer to the liquid being evaluated by the machine learning engine to identify delay in the rate of thermal energy transfer that quantifies an amount of scaling in the boiler. In the same or a different embodiment, the BMM may be to cause an indication regarding the amount of scaling determined to be in the boiler to be generated. The device may reside, for example, within the enclosure. Alternatively, at least a portion of the device may be external to the enclosure, the communication module receiving the sensor data from the at least one sensor via at least one of a local-area network or a wide-area network.

A method for determining scaling in a boiler consistent with the present disclosure may comprise, for example, operating a boiler to heat liquid, the boiler being situated in an enclosure, receiving sensor data regarding the operation of the boiler in a device, inputting the sensor data into a BSDM in the device and utilizing the boiler scaling determination module to determine an amount of scaling in the boiler. At least one machine-readable storage medium having stored thereon, individually or in combination, instructions for determining scaling in a boiler consistent with the present disclosure that, when executed by one or more processors, may cause the one or more processors to, for example, operate a boiler to heat liquid, the boiler being situated in an enclosure, receive sensor data regarding the operation of the boiler in a device, input the sensor data into a boiler scaling determination module in the device and utilize the boiler scaling determination module to determine an amount of scaling in the boiler. A device to determine scaling in a boiler consistent with the present disclosure may comprise, for example, a communication module to receive sensor data in regard to operation of a boiler and a boiler monitoring module having a boiler scaling determination module to determine an amount of scaling in the boiler based at least on the sensor data and cause an indication regarding the amount of scaling determined to be in the boiler to be generated.

FIG. 1 illustrates an example system for determining scaling in a boiler utilizing a model in accordance with at least one embodiment of the present disclosure. System 100 may comprise at least boiler 102 and device 104. Boiler 102 may be any vessel capable of containing liquid for the purpose of heating up the liquid based on heat applied by an internal or external heat source. While an example of boiler 102 that may be referenced herein is a hot water boiler in a beverage machine that may be capable of providing coffee, tea, etc. to a consumer (e.g., for a fee), this use is merely a straightforward example usable to explain various embodiments consistent with the present disclosure, and is not intended to limit these embodiments to a particular implementation. In at least one embodiment, boiler 102 may reside within enclosure 106. Enclosure 106 may be any housing capable of containing boiler 102. Continuing along with the example of a beverage machine, enclosure 106 may be the housing of the exterior cabinet of the beverage machine, an interior receptacle within the exterior cabinet of the beverage machine to house boiler 102, etc.

Device 104 may be any device comprising processing resources capable of carrying out activities such as will be described below in regard to the various embodiments disclosed herein. While particular abilities and features will be disclosed in FIG. 2, various examples of device 104 may comprise, but are not limited to, a mobile communication device such as a cellular handset, a smart phone, etc. based on the Android® operating system (OS) from the Google Corporation, iOS® from the Apple Corporation, Windows® OS from the Microsoft Corporation, Mac OS from the Apple Corporation, Tizen™ OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, a Surface® from the Microsoft Corporation, Galaxy Tab® from the Samsung Corporation, a Kindle Fire® from the Amazon Corporation, etc., an Ultrabook® including a low-power chipset manufactured by Intel Corporation, netbooks, a notebook, a laptop, a palmtop, etc., a wearable devices such as wristwatch form factor computing devices like the Galaxy Gear® from Samsung, eyewear form factor interfaces like Google Glass® from the Google Corporation, etc., a typically stationary computing device such as a desktop computer, a server, a smart television, a small form factor computing solution (e.g., for space-limited computing applications, TV set-top boxes, etc.) like the Next Unit of Computing (NUC) platform from the Intel Corporation, etc.

Information about the operation of boiler 102 may be provided to device 104 via sensors 108. In at least one embodiment sensors 108 may include at least voltage and/or current sensors, and temperature sensors such as thermistors, thermocouples, etc. These basic varieties of sensors 108 may provide sensor data 110 to device 104. For example, sensor data 110 may comprise at least data regarding electrical input to boiler 102 (e.g., to a heating element configured to heat up the liquid in boiler 102), a temperature of a liquid in boiler 102 and a temperature of enclosure 106. In at least one embodiment, the enclosure temperature may correspond to the temperature of enclosure 106 itself (e.g., of an interior surface inside of enclosure 106), of ambient air within enclosure 106, etc., which may correspond to an amount of heat being lost from boiler 102 to the environment. However, sensors 108 may also comprise other categories of sensors such as touch sensors, proximity sensors, motion sensors, etc. These types of sensors 108 may be used to provide other types of sensor data 110 to device 104 that is not illustrated in FIG. 1. For example, in the instance of a beverage machine touch or proximity sensors may sense if the machine is vending a hot beverage, and thus, that boiler 102 is not at steady state (e.g., that cold water may be introduced to boiler 102 to replace hot water expended during beverage vending). In at least one embodiment, device 104 may reside within, or at least adjacent to, enclosure 106, and thus, sensor data 110 may be conveyed to device 104 via wired communication and/or short-range wireless communication such as, for example, Bluetooth, Wireless Local-Area Networking (WLAN), etc. In an alternative implementation, at least a portion of device 104 may be situated remotely from enclosure 106. Sensor data 110 may then be communicated to device 104 through interaction over a LAN and/or WAN such as, for example, the Internet.

Device 104 may comprise, for example, BMM 112 that may include BSDM 114. In an example of operation, BMM 112 may receive sensor data 110 and may input sensors data 110 into BSDM 114. BSDM 114 may then utilize sensor data 110 to determine an amount of scaling in boiler 102. An example describing the manner in which the amount of scaling in boiler 102 is determined will be explained further in regard to FIG. 3-5. BSDM 114 and/or BMM 112 may then cause device 104 to generate notification 116. Notification 116 may comprise, for example, a visual and/or audible alert informing a user (e.g., an owner of a hot beverage machine, a person responsible for maintaining a hot beverage machine, a hot beverage machine monitoring service, etc.) about the condition of boiler 102. Notification 116 may be generated regularly regardless of whether boiler 102 requires service or not (e.g., such as a regular boiler "health" notification), or just in instances where BSDM 114 determines that the amount of scaling requires boiler 102 to be serviced (e.g., such as a boiler service requirement alert). The manner in which notification 116 is generated may depend on the service model for boiler 102. For example, if a user such as an owner, a service entity, etc. regularly inspects boiler 102 (e.g., the hot beverage machine) in-person, then notification 116 may be localized on enclosure 106, such as a lighted and/or audible alert. In the localized scenario it may also be possible for a user to access more specific data in device 104 such as a level of scaling in boiler 102, a measure of efficiency based on the amount of scaling in boiler 102, etc. Notification 116 may also be transmitted to a user device for the owner or service entity such as, for example, a smart phone, tablet computer, laptop computer, desktop computer, etc. In another example service model, a centralized monitoring and/or servicing entity may monitor a plurality of boilers 102 from a remote location, and may receive notifications 116 for all monitored boilers 102 at the remote location via, for example, LAN or WAN direct access, email, short message service (SMS), etc. When a notification 116 indicates that service is required for one of the monitored boilers 102, the centralized monitoring and/or servicing entity may inform the owner of boiler 102 and/or other responsible party that service is required, may schedule a service professional to perform the required maintenance, etc. In the case where monitoring is centralized, the service and/or monitoring entity need not be physically close to boiler 102. For example, at least one server accessible via a WAN like the Internet (e.g., in a "cloud" configuration) may be capable of monitoring boilers 102 anywhere in the world.

Figure 2:
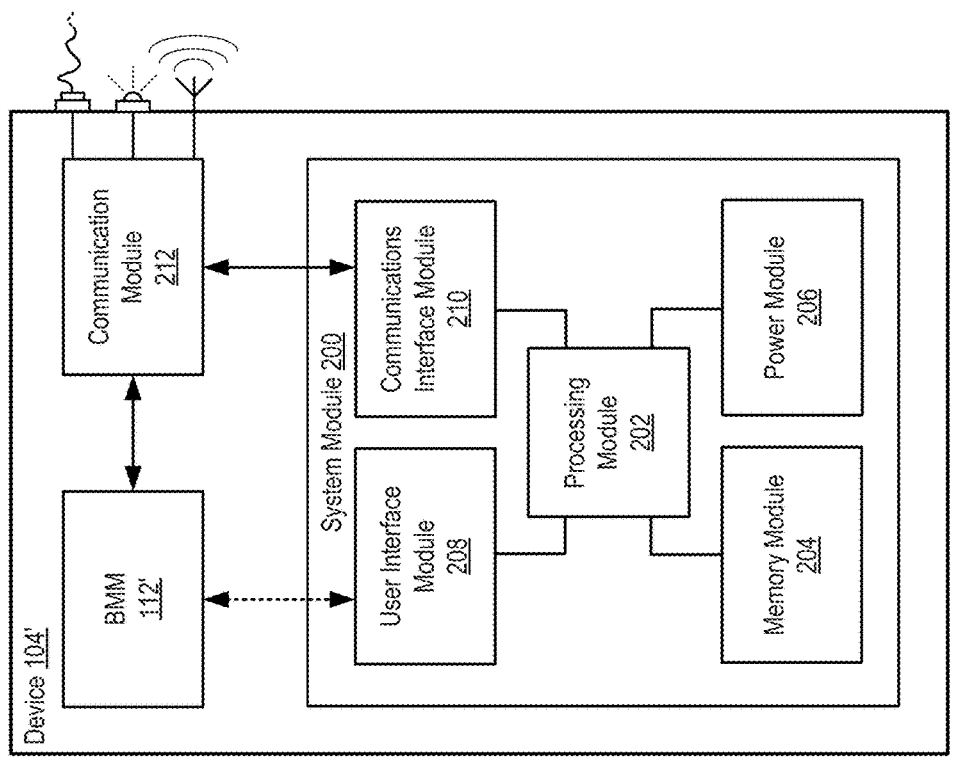
FIG. 2 illustrates an example configuration for a device usable in accordance with at least one embodiment of the present disclosure.

FIG. 2 illustrates an example configuration for a device usable in accordance with at least one embodiment of the present disclosure. In particular, example device 104' may be capable of performing any of the activities disclosed in FIG. 1. However, device 104' is meant only as an example of an apparatus usable in embodiments consistent with the present disclosure, and is not meant to limit any of these various embodiments to any particular manner of implementation.

Device 104' may comprise, for example, system module 200 configured to manage device operations. System module 200 may include, for example, processing module 202, memory module 204, power module 206, user interface module 208 and communication interface module 210. Device 104' may further include communication module 212 and BMM 112'. While communication module 212 and BMM 112' have been illustrated as separate from system module 200, the example implementation shown in FIG. 2 has been provided merely for the sake of explanation. Some or all of the functionality associated with communication module 210 and/or BMM 112' may also be incorporated into system module 200.

In device 104', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 104'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 104'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include volatile memory configured to hold information during the operation of device 104' such as, for example, static RAM (SRAM) or Dynamic RAM (DRAM). ROM may include non-volatile (NV) memory modules configured based on BIOS, UEFI, etc. to provide instructions when device 104' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply device 104' with the power needed to operate. User interface module 208 may include hardware and/or software to allow users to interact with device 104' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 208 may be incorporated within device 104' and/or may be coupled to device 104' via a wired or wireless communication medium.

Communication interface module 210 may be configured to manage packet routing and other control functions for communication module 212, which may include resources configured to support wired and/or wireless communications. In some instances, device 104' may comprise more than one communication module 212 (e.g., including separate physical interface modules for wired protocols and/or wireless radios) all managed by a centralized communication interface module 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, BMM 112' may be able to interact with at least communication module 212, and optionally with user interface module 208. In an example of operation, BMM 112' may receive sensor data 110 from sensors 108. Following a determination of a scaling in boiler 102 by BSDM 114 based on sensor data 110, BMM 112' may then generate notification 116. In at least one embodiment, BMM 112' may cause communication module 208 to transmit notification 116 via wired and/or wireless communication (e.g., to a user device for an owner or service entity, a remotely located centralized monitoring device associated with a monitoring and/or service entity, etc.). Along with, or instead of, providing notification 116 to communication module 212, BMM 112' may provide notification 116 to user interface module 112 for presentation to a user of device 104'. Presentation may include, for example, displaying a visual notification, generating an audible and/or tactile notification, etc. In at least one embodiment, the visual notification may further provide user interface features allowing a user to obtain additional data about the condition of boiler 102 (e.g., and/or the hot beverage machine).

Figure 3:
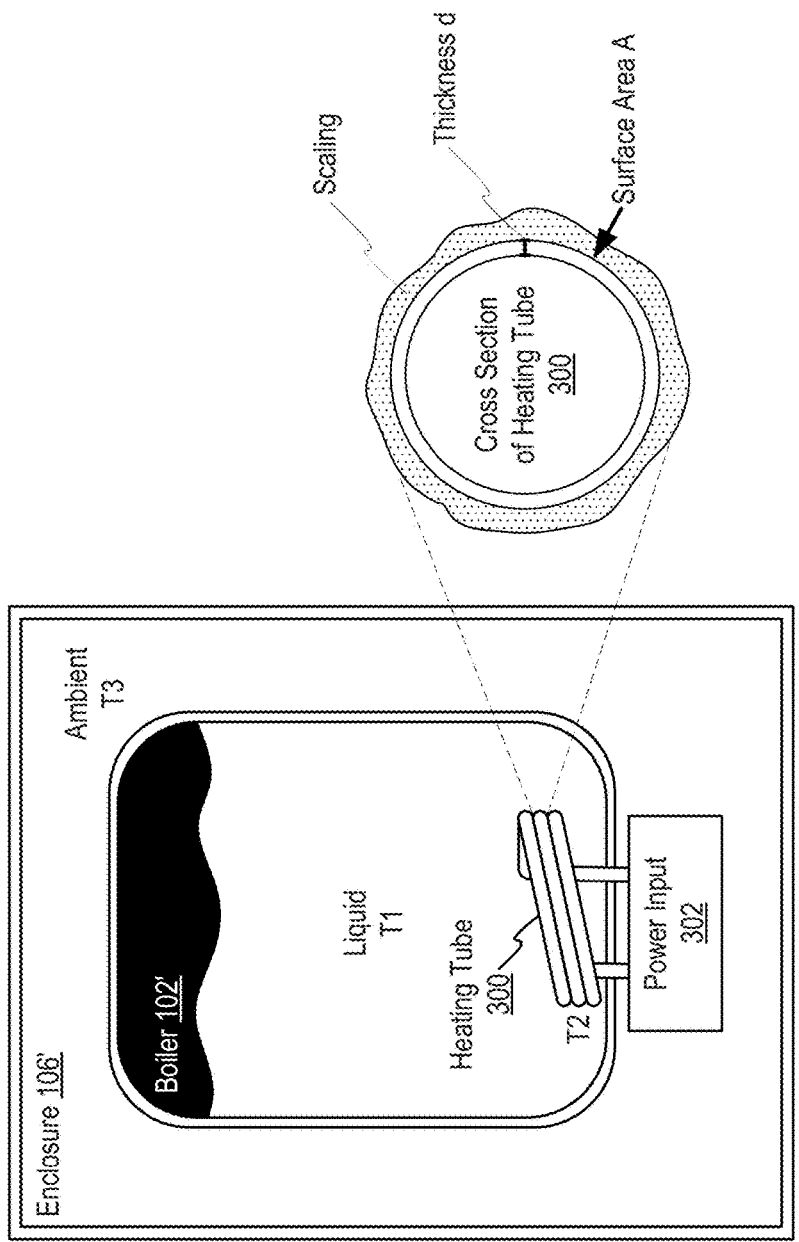
FIG. 3 illustrates an example of principles utilized in a boiler scaling determination model in accordance with at least one embodiment of the present disclosure.

FIG. 3 illustrates an example of principles utilized in a BSDM in accordance with at least one embodiment of the present disclosure. BSDM 114 may comprise, for example, at least a hybrid model for the real time determination of scaling in boiler 102'. The model in BSDM 114 may be considered "hybrid" in that it may include an analytic model combining the laws of physics with a machine learning engine to identify scaling conditions. An example scenario on which the model in BSDM 114 is based is disclosed in FIG. 3 wherein enclosure 106' may enclose boiler 102'. Boiler 102' may comprise a liquid (e.g., water) to be heated by heating tube 300. In this instance, heating tube 300 is powered by power input 302. In at least one embodiment, the power input may be electrical power, however, other power sources may also be employed such as, but not limited to, gas, propane, hydrogen, biofuel, solar, etc. Consistent with the present disclosure, the rate of heat transfer from heating tube 300 to the liquid may be characterized by the equation:

$$\text{Rate of Heat Transfer}(W=\text{Joule/sec})=k(T1-T2)A/d \quad (1)$$

wherein T1 and T2 are temperatures of heating tube 300 and the liquid, respectively, k is coefficient of heat transfer (W/m/deg C.) of heating tube 300, A is the surface area of heating tube 300 and d is the thickness of heating tube 300 illustrated by the cross section of heating tube 300. The value of k may differ based on the material. For example, materials that may be utilized in the construction of heating tube 300 may have k values of 386.01 W/m/deg C. for pure copper and 17.4 W/m/deg C. for stainless steel. On the contrary, the materials that may develop as scaling on the surface of heating tube 300 may have k values of 1.16-2.32 W/m/deg C. for Calcium Sulfate, 0.58-1.16 W/m/deg C. for Calcium Carbonate and 0.23-0.58 W/m/deg C. for Silica. As evident by the substantial difference in k values for these materials, scaling on heat tube 300 may act as an insulator that may severely reduce the rate of heat transfer from heating tube 300 to the liquid. In at least one embodiment, BSDM 114 may utilize the model to compute the rate of heat transfer based on sensor data 110 received from sensors 108 including, for example, the boiler temperature and power input (e.g., based on a sensed current input). Taking the above relationships into account, the model in BSDM 114 may be based on the thermal energy actually being applied to the liquid:

$$\text{Thermal energy input to the boiler} = \text{Thermal energy absorbed by the boiler liquid} + \text{Thermal energy lost to the environment via the boiler surface.} \quad (2)$$

The power input to boiler 102' (e.g., in Watts or Joules/sec) may be directly proportional to the thermal energy input to boiler 102'. The energy lost to the environment via the surface of boiler 102' may be directly proportional to the difference in temperature between heating tube 102 (T2) and the sensed temperature of enclosure 106' (T3). The energy absorbed by the liquid in boiler 102' may be proportional to the rate of heat transfer. The presence of scaling in boiler 102' will become apparent as a delay in the heat transfer.

Figure 4:
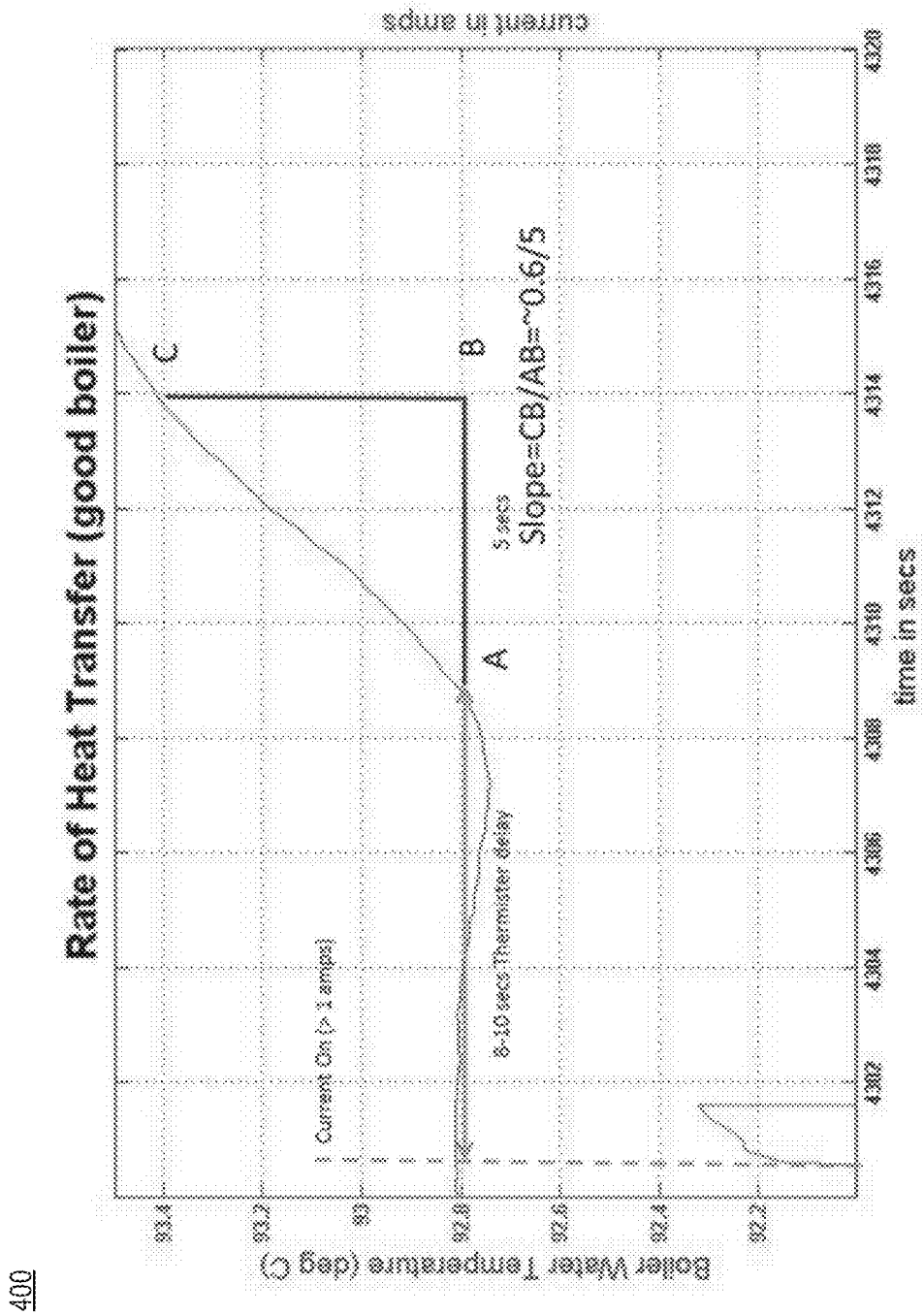
FIG. 4 illustrates an example of a heat transfer rate in a good boiler in accordance with at least one embodiment of the present disclosure.
Figure 5:
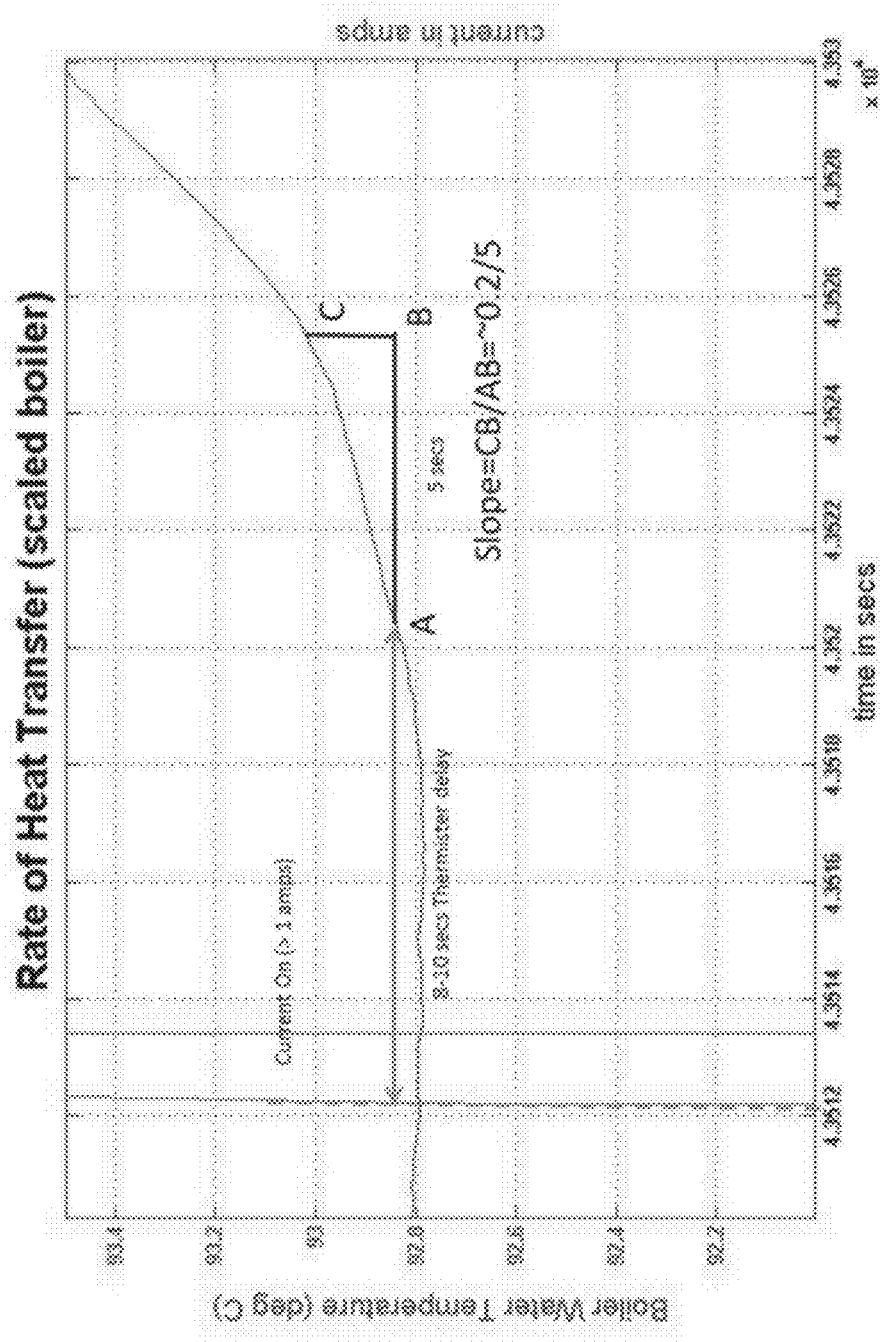
FIG. 5 illustrates an example of a heat transfer rate in a scaled boiler in accordance with at least one embodiment of the present disclosure.

In at least one embodiment, the physics-based portion of the model in BSDM 114 may compute the rate of heat transfer to boiler 102' based on the power input and boiler temperature data. For example, during steady state the rate of heat transfer may be directly proportional to the slope of the boiler temperature rise that may be computed as shown in FIGS. 4 and 5, wherein chart 400 corresponds to a good boiler 102' and chart 500 corresponds to a scaled boiler 102'. The slope values of charts 400 and 500 correspond to the rate thermal energy transfer from heating tube 300 to the liquid, and may be computed, for example, eight seconds after the "current on" time of boiler 102' as shown in charts 400 and 500. The slope may then be computed, for example, over the next five seconds of temperature values to estimate the delay in heat transfer. The physics based model may compute the thermal energy lost to the environment based on the difference between the temperature of the liquid (T1) and the temperature of enclosure 106' (T3) following the logic that at steady state the temperatures of the liquid in boiler 102' (T1) and heating tube 300 are the same (e.g., such as in the instance of a hot beverage vending machine a "No Vending" state when no hot water is being dispensed). Hence, when boiler 102' is switched on and at steady state, the temperature of the liquid in boiler 102' (T1) and the temperature of enclosure 106' (T3) may be sensed (e.g., using a thermocouple). The difference between the temperatures (e.g., T1-T3) may account for the thermal energy lost from boiler 102' to the environment. The rate of thermal energy transfer to the liquid in boiler 102' may then be determined by adjusting the rate of thermal energy transfer to boiler 102', based on the slope, for the thermal energy lost from boiler 102' to the environment.

At least the determined rate of thermal energy transfer to the liquid in boiler 102' may then be provided to the machine learning engine in the model to determine boiler condition. Physics-based methods enable design and development of robust parameters, based on proven and tested laws of physics. The machine learning engine is capable of learning the nonlinear boundaries between these parameters in a multi-dimensional feature space, to be able to identify the healthy and scaling condition of a boiler at real time. The combination of the strengths of these approaches makes the model highly accurate. For example, when an actual BSDM 114 was trained with 65% of a data set randomly selected from three good boilers 102' and three scaled boilers 102', and then the hybrid model was tested using the remaining 35% of the data set, it has been observed that the hybrid model achieved near 100% accuracy in determining the scaling condition of the test boilers 102'.

Example parameters that may be employed in BSDM 114 are as follows. Example signal processing parameters may be employed in BSDM 114 may include, but are not limited to, a sampling rate of the temperature and current sensor data=5 samples/second, a moving average window length for boiler temperature=5 seconds, a moving average window length for boiler enclosure temperature=5 seconds and a threshold value for clipping differences in consecutive temperature values=0.15 deg. C. Example parameters for the physics based model to compute the rate of heat transfer from the data may include, but are not limited to, a threshold for valid current=1 amp, a hold sample number for considering a valid current=2, a hold sample number for considering a current off period subsequent to a current on period=3, a delay after which the boiler temperature values are recorded=8 seconds and a time period for which the temperature values are recorded=8-13 seconds. Example parameters of the machine learning engine that enabled near 100% accuracy in detecting scaling condition may include, but are not limited to classification model type: Support Vector Machine, Kernel type: Linear kernel, Error penalty: 1 and Error tolerance=0.001.

Figure 6:
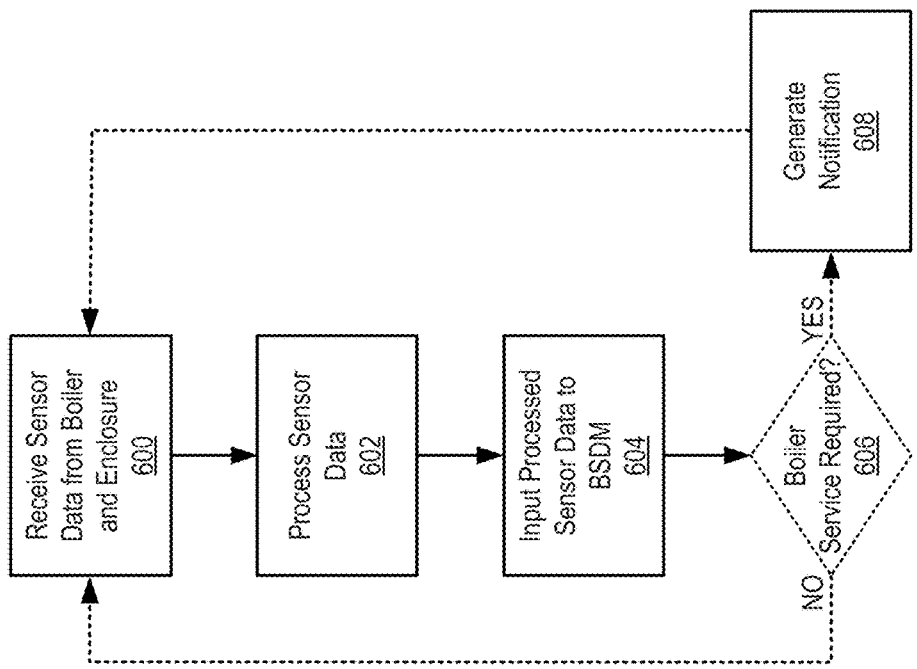
FIG. 6 illustrates example operations for determining scaling in a boiler in accordance with at least one embodiment of the present disclosure.

FIG. 6 illustrates example operations for determining scaling in a boiler utilizing a model in accordance with at least one embodiment of the present disclosure. In operation 600 sensor data may be received in a BMM from a boiler and enclosure. For example, at least one sensor in the boiler and enclosure may sense the sensor data, and then provide it to the BMM. In operation 602 the sensor data may be processed. Processing the sensor data may comprise, for example, filtering the sensor data to remove noise, validating the sensor data to verify that the sensor data was received from an authentic source (e.g., has not been falsified), etc. Filtering may comprise, for example, scanning the sensor data for values that do not conform with immediately preceding and/or following values, removing values that are completely out of range (e.g., impossible), etc. Validating the senor data may comprise checking signatures, keys, etc. associated with the sensor data to determine a source for the sensor data, to authenticate the source of the sensor data, etc.

The processed sensor data may then be input into the BSDM in operation 604. The BSDM may utilize the sensor data to determine an amount of scaling in the boiler as previously described herein. Operation 606 may be optional in that there is more than one manner in which a notification may be generated consistent with the present disclosure. For example, operation 606 may be included if notifications are only generated when the amount of scaling determined to exist in the boiler requires action (e.g., servicing and/or replacement). A determination may be made in operation 606 as to whether the boiler requires service based on the results generated by the BSDM. A determination in operation 606 that the amount of scaling in the boiler does not justify servicing may be followed by a return to operation 600 where monitoring may continue. If in operation 606 it is determined that service is required, then in operation 608 a notification may be generated indicating the need to service the boiler. In an alternative implementation, notifications may be generated regularly in operation 608 as to the general health of the boiler. In such a situation, operation 608 may always occur after operation 604, operation 608 being followed by an optional return to operation 600 wherein monitoring of the boiler may continue.

While FIG. 6 illustrates operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a system for determining scaling in a boiler. At least one sensor may monitor a boiler during operation and provide sensor data to a boiler monitoring module including a boiler scaling determination module that may determine an amount of scaling in the boiler. Example sensor data may comprise power input, a temperature of liquid in the boiler and an air temperature within an enclosure housing the boiler. The boiler monitoring module may determine thermal energy transfer to the boiler based on the liquid and enclosure temperatures. A machine learning engine may determine a rate of thermal energy transfer to the liquid in view of the power input, the rate of thermal energy transfer being evaluated by the machine learning engine to identify delay in the rate of thermal energy transfer that quantifies an amount of scaling in the boiler.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for determining scaling in a boiler utilizing a model.

According to example 1 there is provided a system to determine scaling in a boiler. The system may comprise a boiler to heat a liquid, an enclosure in which the boiler operates at least one sensor to generate sensor data in regard to operation of the boiler and a device including at least a communication module to receive the sensor data from the at least one sensor and a boiler monitoring module having a boiler scaling determination module to determine an amount of scaling in the boiler based at least on the sensor data.

Example 2 may include the elements of example 1, wherein the at least one sensor is to sense power input to heat the liquid in the boiler, the power input being included in the sensor data.

Example 3 may include the elements of example 2, wherein the at least one sensor is to sense a temperature of the liquid in the boiler, the liquid temperature being included in the sensor data.

Example 4 may include the elements of example 3, wherein the at least one sensor is to sense a temperature of the enclosure, the enclosure temperature being included in the sensor data.

Example 5 may include the elements of example 4, wherein the enclosure temperature measures a temperature of ambient air within the enclosure to determine an amount of heat lost by the boiler during operation.

Example 6 may include the elements of any of examples 4 to 5, wherein the power input, liquid temperature and enclosure temperature are sampled within a five second moving average window.

Example 7 may include the elements of any of examples 4 to 6, wherein the boiler scaling determination module is to at least one of remove noise from the sensor data or validate the sensor data.

Example 8 may include the elements of any of examples 4 to 7, wherein the boiler scaling determination module is to determine thermal energy transfer to the boiler based at least on the power input and the liquid temperature.

Example 9 may include the elements of example 8, wherein the boiler scaling determination module comprises a machine learning engine to determine the amount of scaling in the boiler based at least on the thermal energy transfer to the boiler and the enclosure temperature.

Example 10 may include the elements of example 9, wherein the machine learning engine is a support vector machine with a linear kernel having an error penalty of 1 and an error tolerance of 0.001.

Example 11 may include the elements of any of examples 9 to 10, wherein the machine learning engine being to determine the amount of scaling in the boiler comprises the machine learning engine being to determine a rate of thermal energy transfer to the liquid in the boiler in view of the enclosure temperature, the rate of thermal energy transfer to the liquid being evaluated by the machine learning engine to identify delay in the rate of thermal energy transfer that quantifies an amount of scaling in the boiler.

Example 12 may include the elements of any of examples 1 to 11, wherein the boiler monitoring module is to cause an indication regarding the amount of scaling determined to be in the boiler to be generated.

Example 13 may include the elements of example 12, wherein the indication comprises an alert as to the boiler requiring service based on the amount of scaling determined to be in the boiler.

Example 14 may include the elements of any of examples 1 to 13, wherein the device resides within the enclosure.

Example 15 may include the elements of any of examples 1 to 14, wherein at least a portion of the device is external to the enclosure, the communication module receiving the sensor data from the at least one sensor via at least one of a local-area network or a wide-area network.

Example 16 may include the elements of any of examples 1 to 15, wherein the at least one sensor is to sense at least power input to heat the liquid in the boiler, a temperature of the liquid in the boiler and an enclosure temperature, the sensor data including the power input, liquid temperature and enclosure temperature.

Example 17 may include the elements of any of examples 1 to 16, wherein at least the boiler and the enclosure are components of a hot beverage vending machine.

According to example 18 there is provided a method for determining scaling in a boiler. The method may comprise operating a boiler to heat liquid, the boiler being situated in an enclosure, receiving sensor data regarding the operation of the boiler in a device, inputting the sensor data into a boiler scaling determination module in the device and utilizing the boiler scaling determination module to determine an amount of scaling in the boiler.

Example 19 may include the elements of example 18, wherein the sensor data comprises power input to heat liquid in the boiler, a temperature of the liquid in the boiler and a temperature of the enclosure.

Example 20 may include the elements of example 19, wherein the power input, liquid temperature and enclosure temperature are sampled within a five second moving average window.

Example 21 may include the elements of any of examples 19 to 20, and may further comprise at least one of removing noise from the sensor data or validating the sensor data.

Example 22 may include the elements of any of examples 19 to 21, and may further comprise at least one of determining thermal energy transfer to the boiler based at least on the power input and the liquid temperature.

Example 23 may include the elements of example 22, and may further comprise utilizing a machine learning engine to determine the amount of scaling in the boiler based at least on the thermal energy transfer to the boiler and the enclosure temperature.

Example 24 may include the elements of example 23, wherein the machine learning engine is a support vector machine with a linear kernel having an error penalty of 1 and an error tolerance of 0.001.

Example 25 may include the elements of any of examples 23 to 24, wherein determining the amount of scaling in the boiler comprises determining a rate of thermal energy transfer to the liquid in the boiler in view of the enclosure temperature and evaluating the rate of thermal energy transfer to the liquid using the machine learning engine to identify delay in the rate of thermal energy transfer that quantifies an amount of scaling in the boiler.

Example 26 may include the elements of any of examples 18 to 25, and may further comprise causing an indication regarding the amount of scaling determined to be in the boiler to be generated.

Example 27 may include the elements of example 26, wherein the indication comprises an alert as to the boiler requiring service based on the amount of scaling determined to be in the boiler.

According to example 28 there is provided a system including at least a boiler and a device, the system being arranged to perform the method of any of the above examples 18 to 27.

According to example 29 there is provided a chipset arranged to perform the method of any of the above examples 18 to 27.

According to example 30 there is provided at least one machine readable medium comprising a plurality of instructions that, in response to be being executed on a computing device, cause the computing device to carry out the method according to any of the above examples 18 to 27.

According to example 31 there is provided a device configured for determining scaling in a boiler, the device being arranged to perform the method of any of the above examples 18 to 27.

According to example 32 there is provided a system for determining scaling in a boiler. The system may comprise means for operating a boiler to heat liquid, the boiler being situated in an enclosure, means for receiving sensor data regarding the operation of the boiler in a device, means for inputting the sensor data into a boiler scaling determination module in the device and means for utilizing the boiler scaling determination module to determine an amount of scaling in the boiler.

Example 33 may include the elements of example 32, wherein the sensor data comprises power input to heat liquid in the boiler, a temperature of the liquid in the boiler and a temperature of the enclosure.

Example 34 may include the elements of example 33, and may further comprise at least one of means for removing noise from the sensor data or means for validating the sensor data.

Example 35 may include the elements of any of examples 33 to 34, and may further comprise means for determining thermal energy transfer to the boiler based at least on the power input and the liquid temperature.

Example 36 may include the elements of example 35, and may further comprise means for utilizing a machine learning engine to determine the amount of scaling in the boiler based at least on the thermal energy transfer to the boiler and the enclosure temperature.

Example 37 may include the elements of example 36, wherein the means for determining the amount of scaling in the boiler may comprises means for determining a rate of thermal energy transfer to the liquid in the boiler in view of the enclosure temperature and means for evaluating the rate of thermal energy transfer to the liquid using the machine learning engine to identify delay in the rate of thermal energy transfer that quantifies an amount of scaling in the boiler.

Example 38 may include the elements of any of examples 32 to 37, and may further comprise means for causing an indication regarding the amount of scaling determined to be in the boiler to be generated.

According to example 39 there is provided a device configured for determining scaling in a boiler. The device may comprise a communication module to receive sensor data in regard to operation of a boiler and a boiler monitoring module having a boiler scaling determination module to determine an amount of scaling in the boiler based at least on the sensor data and cause an indication regarding the amount of scaling determined to be in the boiler to be generated.

Example 40 may include the elements of example 39, wherein the boiler scaling determination module is to determine thermal energy transfer to the boiler based at least on a power input to heat a liquid in the boiler and a temperature of the liquid in the boiler, the power input and liquid temperature being received as part of the sensor data.

Example 41 may include the elements of example 40, wherein the boiler scaling determination module comprises a machine learning engine to determine the amount of scaling in the boiler based at least on the thermal energy transfer to the boiler and a temperature of an enclosure in which the boiler operates, the enclosure temperature being received as part of the sensor data.

Example 42 may include the elements of example 41, wherein the machine learning engine being to determine the amount of scaling in the boiler comprises the machine learning engine being to determine a rate of thermal energy transfer to the liquid in the boiler in view of the enclosure temperature, the rate of thermal energy transfer to the liquid being evaluated by the machine learning engine to identify delay in the rate of thermal energy transfer that quantifies an amount of scaling in the boiler.

Example 43 may include the elements of any of examples 41 to 42, wherein the device resides within the enclosure.

Example 44 may include the elements of any of examples 41 to 42, wherein at least a portion of the device is external to the enclosure, the communication module receiving the sensor data from the at least one sensor via at least one of a local-area network or a wide-area network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
   a boiler to heat a liquid;
   an enclosure in which the boiler operates; and
   a subsystem to determine scaling in the boiler, the subsystem comprising:
   a first temperature sensor to sense a temperature of the liquid in the boiler;
   a second temperature sensor to sense an enclosure temperature;

a power sensor to sense power input to heat the liquid in the boiler;

communication circuitry to receive, as sensor data, the temperature of the liquid from the first temperature sensor, the enclosure temperature from second temperature sensor, and the power input from the power sensor; and boiler monitoring circuitry to determine a rate of heat transfer and an amount of scaling in the boiler, the amount of scaling being determined based on the rate of heat transfer, the rate of heat transfer being determined based, at least in part, on the temperature of the liquid, the enclosure temperature, and the power input to the boiler.

2. The system of claim 1, wherein the boiler monitoring circuitry is to at least one of remove noise from the sensor data or validate the sensor data.

3. The system of claim 1, wherein the boiler monitoring circuitry is to determine thermal energy transfer to the boiler based at least on the power input and the temperature of the liquid.

4. The system of claim 3, wherein the boiler monitoring circuitry comprises a machine learning engine to determine the amount of scaling in the boiler based at least on the thermal energy transfer to the boiler and the enclosure temperature.

5. The system of claim 4, wherein the machine learning engine being to determine the amount of scaling in the boiler comprises the machine learning engine being to determine a rate of thermal energy transfer to the liquid in the boiler in view of the enclosure temperature, the rate of thermal energy transfer to the liquid being evaluated by the machine learning engine to identify delay in the rate of thermal energy transfer that quantifies an amount of scaling in the boiler.

6. The system of claim 1, wherein the boiler monitoring circuitry is to cause an indication regarding the amount of scaling determined to be in the boiler to be generated.

7. A method for maintaining a boiler, comprising:
receiving, from a first temperature sensor, a temperature of a liquid being heated by the boiler;
receiving, from a second temperature sensor, a temperature of an enclosure enclosing the boiler;
receiving, from a power sensor, an amount of power input into the boiler to heat the liquid;
inputting sensor data comprising the temperature of the liquid, the temperature of the enclosure, and the amount of power input into boiler scaling determination circuitry;
utilizing the boiler scaling determination circuitry to determine thermal energy transfer to the boiler based at least on the power input and the temperature of the liquid;
utilizing the boiler scaling determination circuitry to determine an amount of scaling in the boiler based at least on the thermal energy transfer;
in response to the amount of scaling exceeding a predetermined amount, generating a notification indicating a level of scaling in the boiler; and
in response to the notification being generated, replacing the boiler.

8. The method of claim 7, further comprising at least one of:
removing noise from the sensor data; or
validating the sensor data.

9. The method of claim 7, further comprising:
utilizing a machine learning engine to determine the amount of scaling in the boiler based at least on the thermal energy transfer to the boiler and the temperature of the enclosure.

10. The method of claim 9, wherein determining the amount of scaling in the boiler comprises:
determining a rate of thermal energy transfer to the liquid in the boiler in view of the temperature of the enclosure; and
evaluating the rate of thermal energy transfer to the liquid using the machine learning engine to identify delay in the rate of thermal energy transfer that quantifies an amount of scaling in the boiler.

11. The method of claim 7, further comprising:
causing an indication regarding the amount of scaling determined to be in the boiler to be generated.

12. At least one non-transitory machine-readable storage medium having stored thereon, individually or in combination, instructions for maintaining a boiler that, when executed by one or more processors, cause the one or more processors to:
receive, from a first temperature sensor, a temperature of a liquid being heated by the boiler;
receive, from a second temperature sensor, a temperature of an enclosure enclosing the boiler;
receive, from a power sensor, an amount of power input into the boiler to heat the liquid;
input sensor data comprising the temperature of the liquid, the temperature of the enclosure, and the amount of power input into boiler scaling determination circuitry;
utilize the boiler scaling determination circuitry to determine thermal energy transfer to the boiler based at least on the power input and the temperature of the liquid;
utilize the boiler scaling determination circuitry to determine an amount of scaling in the boiler based at least on the thermal energy transfer; and
generate a notification indicating a level of scaling in the boiler.

13. The medium of claim 12, further comprising instructions that, when executed by one or more processors, cause the one or more processors to at least one of:
remove noise from the sensor data; or
validate the sensor data.

14. The medium of claim 12, further comprising instructions that, when executed by one or more processors, cause the one or more processors to:
utilize a machine learning engine to determine the amount of scaling in the boiler based at least on the thermal energy transfer to the boiler and the temperature of the enclosure.

15. The medium of claim 14, wherein determining the amount of scaling in the boiler comprises instructions that, when executed by one or more processors, cause the one or more processors to:
determine a rate of thermal energy transfer to the liquid in the boiler in view of the temperature of the enclosure; and
evaluate the rate of thermal energy transfer to the liquid using the machine learning engine to identify delay in the rate of thermal energy transfer that quantifies an amount of scaling in the boiler.

16. The medium of claim 12, further comprising instructions that, when executed by one or more processors, cause the one or more processors to:
cause an indication regarding the amount of scaling determined to be in the boiler to be generated.

17. A device to determine scaling in a boiler, comprising:
communication circuitry receive, as sensor data, a temperature of a liquid in the boiler from a temperature sensor and a measure of power input to heat the liquid in the boiler from a power sensor;
and
boiler monitoring circuitry having boiler scaling determination circuitry to:
determine thermal energy transfer to the boiler based at least on the power input to heat the liquid in the boiler and the temperature of the liquid in the boiler;
determine an amount of scaling in the boiler based at least on the thermal energy transfer; and
cause an indication regarding the amount of scaling determined to be in the boiler to be generated.

18. The device of claim 17, wherein the boiler scaling determination circuitry comprises a machine learning engine to determine the amount of scaling in the boiler based at least on the thermal energy transfer to the boiler and a temperature of an enclosure in which the boiler operates, the enclosure temperature being received as part of the sensor data.

19. The device of claim 18, wherein the machine learning engine being to determine the amount of scaling in the boiler comprises the machine learning engine being to determine a rate of thermal energy transfer to the liquid in the boiler in view of the enclosure temperature, the rate of thermal energy transfer to the liquid being evaluated by the machine learning engine to identify delay in the rate of thermal energy transfer that quantifies an amount of scaling in the boiler.

* * * * *